United States Patent
Owen (10) Patent No.: US 9,685,786 B1
(45) Date of Patent: Jun. 20, 2017

(54) AUTOMATIC TRANSFER SWITCH SPACING MONITORING WITHIN AN ELECTRICAL DEVICE

(71) Applicant: Juniper Networks, Inc., Sunnyvale, CA (US)

(72) Inventor: David K. Owen, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 972 days.

(21) Appl. No.: 13/946,916

(22) Filed: Jul. 19, 2013

(51) Int. Cl.
*H02J 3/04* (2006.01)
*H02J 3/00* (2006.01)
*H02J 9/06* (2006.01)

(52) U.S. Cl.
CPC ........ *H02J 3/04* (2013.01); *H02J 3/00* (2013.01); *H02J 3/005* (2013.01); *H02J 9/06* (2013.01); *H02J 2009/068* (2013.01)

(58) Field of Classification Search
CPC ........................................................ H02J 3/04
See application file for complete search history.

(56) References Cited

U.S. PATENT DOCUMENTS

| | | |
|---|---|---|
| 5,920,129 A | 7/1999 | Smith |
| 5,939,799 A | 8/1999 | Weinstein |
| 6,593,670 B2 * | 7/2003 | Anderson ............. H02J 9/08 307/64 |
| 6,879,060 B2 * | 4/2005 | Hohri .................. H02J 9/061 307/29 |
| 7,110,225 B1 * | 9/2006 | Hick ................... H01H 9/542 361/8 |
| 2011/0260538 A1 * | 10/2011 | Huang ................. H02J 9/062 307/64 |
| 2014/0001869 A1 * | 1/2014 | Czarnecki ........... H02J 3/006 307/80 |

OTHER PUBLICATIONS

"Information Technology Equipment—Safety", International Electrotechnical Commission (IEC) 60950-1 Edition 2.0, Dec. 2005, International Standard, available at http://webstore.iec.ch/preview/info_iec60950-1%7Bed2.0%7Den_d.pdf, accessed Jul. 19, 2013, 17 pgs.

* cited by examiner

*Primary Examiner* — Jared Fureman
*Assistant Examiner* — Joel Barnett
(74) *Attorney, Agent, or Firm* — Shumaker & Sieffert, P.A.

(57) ABSTRACT

An automatic transfer switch (ATS) is described that includes a multi-structure of relays that together provide proper spacing, within the ATS, between a first power feed and a second power feed. A monitor circuit is also described that monitors output ports of relays in the first stage of the multi-stage structure and detects that there is or is not proper spacing between the first power feed and the second power feed, within the ATS.

18 Claims, 4 Drawing Sheets

AUTOMATIC TRANSFER SWITCH SPACING MONITORING WITHIN AN ELECTRICAL DEVICE

TECHNICAL FIELD

This disclosure relates to power feeds of a power supply, and more particularly, to relays coupled to the power feeds and the power supply.

BACKGROUND

To provide redundant power feeds to an electronic device, many systems include automatic transfer switches (ATSs). An ATS couples to a plurality of power feeds on a first side and one or more power supplies on a second side. The one or more power supplies receive power from one of the power feeds (e.g., AC power) at a time via the ATS, convert the received power to supply power (e.g., DC power), and supply power to the electronic device. If power from a primary power feed becomes unavailable, the ATS switches from the primary power feed to a backup power feed so that power to the one or more power supplies is uninterrupted. This switching allows the electronic device to remain operational even when the primary power feed is unavailable.

SUMMARY

This disclosure describes techniques for monitoring and detecting conditions in which an automatic transfer switch (ATS) may no longer comply with a minimal spacing requirement due to a failure of one or more internal relays or other event. The techniques may be particularly useful in example implementations in which the ATS is part of a power supply and includes a multi-stage structure of electrical relays. In such implementation, the multi-stage structure may provide a physical spacing between electrical power signals based on the cumulative contact gaps of the relays within different stages of the multi-stage structure. As described herein, a monitor circuit may be used to monitor the relays and detect whether one or more of the relays, in at least an inner stage of the multi-stage structure, malfunctions, thereby potentially compromising the ATS from complying with any minimum spacing requirement.

For instance, in some example implementations, the ATS is coupled to a plurality of power feeds and the multi-stage structure of the relays ensures sufficient physical spacing (e.g., to meet industry standard safety requirements) between electrical connection points within the ATS. In this way, any required minimum spacing is achieved and any possibility of one of the power feeds being undesirably coupled to another one of the power feeds is mitigated. The multi-stage structure may be useful in situations where, for example, a single, pre-existing type of relay may not provide the required spacing. By connecting multiple ones of the pre-existing type of relay in a multi-stage structure, an circuit layout may be provided that achieves sufficient physical spacing between electrical connection points to different power feeds to meet any desired minimum spacing requirement.

Moreover, the monitor circuit described herein may detect a failure of one or more of the relays such that the physical spacing requirement may not met even though the power supply is functioning properly. As such, the monitor circuit may be used to detect conditions in which an electrical device may be fully operational yet may not be compliant with a desired physical spacing requirement. The monitor circuit may couple to the ports of the one or more of the relays in at least the inner stage of the multi-stage structure of relays, and based on the monitoring of the ports, may determine (e.g., detect) whether a relay malfunctioned in such a way that the spacing requirements are not being met.

The techniques described herein may provide certain advantages. For example, because a malfunction that causes the spacing requirement to be violated may not affect the functionality of the power supply, non-compliance with a desired spacing requirement may otherwise go undetected. That is, it may be difficult to determine that the spacing requirement is not being met, especially if the power supply is fully encased and access to the relays is not readily available, such as during operation in the field. By monitoring the ports, the monitor circuit may detect possible violations of the spacing requirement, even during operation, so that proactive measures can be taken if necessary. The monitor circuit may monitor other characteristics of the ATS as well, in some examples.

In one example, the disclosure is directed to an electronic device. The electronic device includes a power supply that couples to a first alternating current (AC) power feed and a second AC power feed. The electronic device also includes an automatic transfer switch (ATS) comprising a multi-stage structure of relays. In this example, a spacing between output ports of relays of a first stage of the multi-stage structure and a spacing between input ports of relays of a second stage of the multi-stage structure is less than a spacing threshold. Also, in this example, a sum of the spacing between output ports of one of the relays of the first stage and the spacing between input ports of one of the relays of the second stage is greater than or equal to the spacing threshold. In this example, the ATS is configured to output AC voltage from one of the first AC power feed and the second AC power feed. The electronic device also includes a monitor circuit configured to monitor at least one of the output ports of the relays of the first stage, and detect, based on the monitoring, that a spacing between the first power feed and the second power feed, within the ATS, is less than the spacing threshold.

In one example, the disclosure is directed to a power supply. The power supply includes an automatic transfer switch (ATS) that couples to a first alternating current (AC) power feed and a second AC power feed and comprises a multi-stage structure of relays. In this example, a spacing between output ports of relays of a first stage of the multi-stage structure and a spacing between input ports of relays of a second stage of the multi-stage structure is less than a spacing threshold. Also, a sum of the spacing between output ports of one of the relays of the first stage and the spacing between input ports of one of the relays of the second stage is greater than or equal to the spacing threshold. In this example, the ATS is configured to output AC voltage from one of the first AC power feed and the second AC power feed. The power supply also includes a monitor circuit configured to monitor at least one of the output ports of the relays of the first stage, and detect, based on the monitoring, that a spacing between the first power feed and the second power feed, within the ATS, is less than the spacing threshold.

In one example, the disclosure is directed to a method. The method includes monitoring, with a monitoring circuit, at least one of a plurality of output ports of relays of a first stage of a multi-stage structure of relays within an automatic transfer switch (ATS). In this example, the ATS receives a first alternating current (AC) power feed and a second AC power feed. Furthermore, a spacing between output ports of relays of the first stage of the multi-stage structure and a spacing between input ports of relays of a second stage of the multi-stage structure is less than a spacing threshold. Also, a sum of the spacing between output ports of one of the relays of the first stage and the spacing between input ports of one of the relays of the second stage is greater than or equal to the spacing threshold. In this example, the ATS is configured to output AC voltage from one of the first AC power feed and the second AC power feed. The method also includes detecting, based on the monitoring, that a spacing between the first power feed and the second power feed within the ATS is less than the spacing threshold.

The details of one or more techniques of the disclosure are set forth in the accompanying drawings and the description below. Other features, objects, and advantages of the techniques will be apparent from the description and drawings, and from the claims.

DETAILED DESCRIPTION

Figure 1:
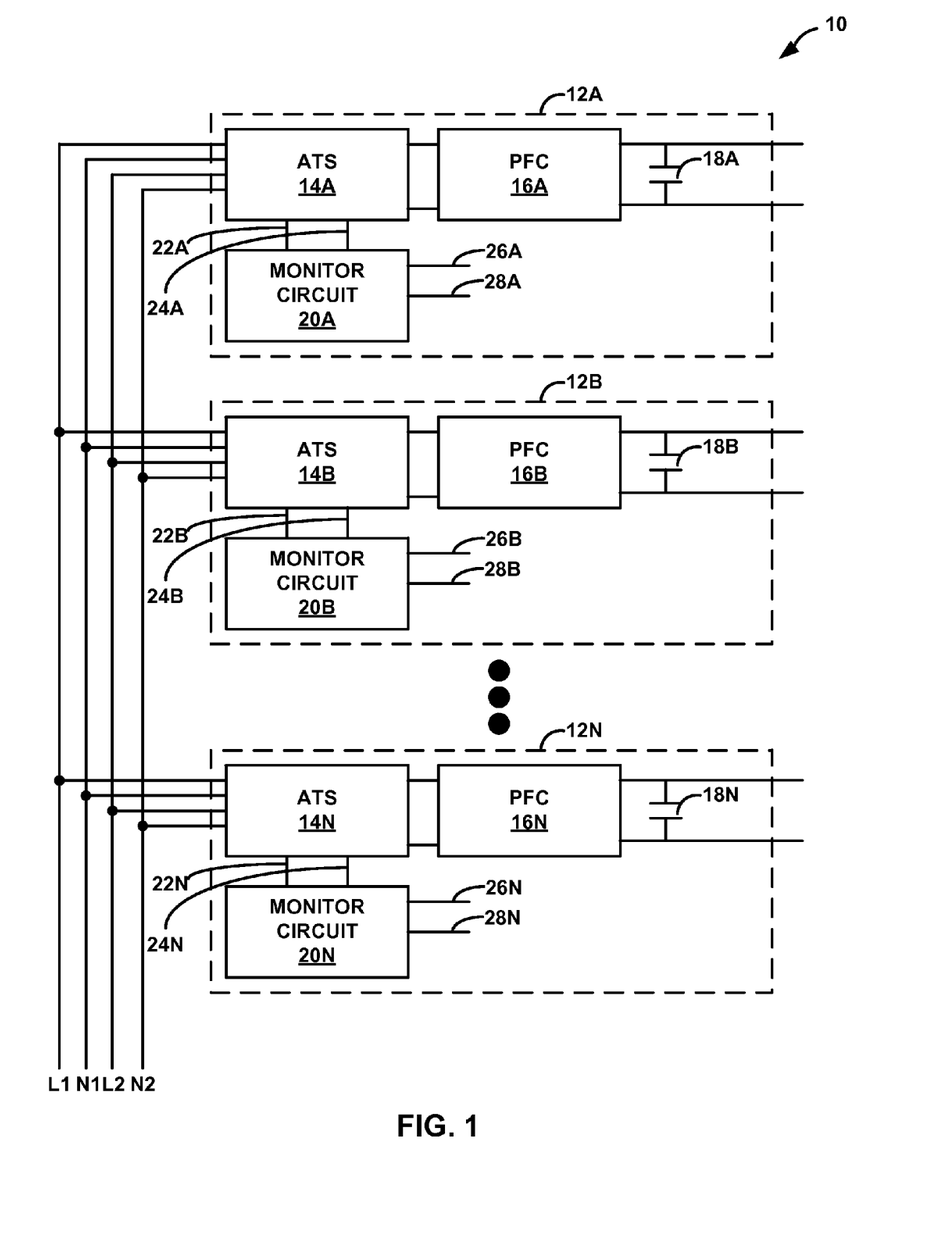
FIG. 1 is a block diagram illustrating an example electronic device configured to implement one or more of the techniques described in this disclosure.

FIG. 1 is a block diagram illustrating a portion of an example electronic device 10. One example of electronic device 10 is a router. For example, electronic device 10 may route data in a network, such as the Internet or a local area network (LAN). Examples of electronic device 10 include the MX2000 line of MX Series 3D Universal Edge Router, the PTX3000 Packet Transport Router, and the Ultimate-Hop Router by Juniper Networks®. The techniques described in this disclosure are not limited to examples where electronic device 10 is a router, and can be extended to other types of electronic devices that utilize power feeds for supplying power.

As illustrated in the example of FIG. 1, electronic device 10 includes a plurality of power supplies 12A-12N (collectively referred to as "power supplies 12"). Each one of power supplies 12 delivers power to components within electronic device 10. For example, power supply 12A delivers power to a first set of communication cards within electronic device 10, power supply 12B delivers power to a second set of communication cards within electronic device 10, and so forth.

In some examples, electronic device 10 may include an additional, redundant power supply in case one of power supplies 12 becomes inoperable. The redundant power supply may be substantially similar to power supplies 12, but may be configured to deliver power to any one of the components within electronic device 10 (i.e., substitute for any of power supplies 12). In examples where electronic device 10 includes the redundant power supply, electronic device 10 includes N+1 power supplies 12 (i.e., power supplies 12A-12N plus one).

Moreover, although FIG. 1 illustrates electronic device 10 as including N power supplies 12, the techniques described in this disclosure are not so limited. In some examples, electronic device 10 may include only one power supply 12 (i.e., N equals one), and no redundant power supply. In some examples, electronic device 10 may include one power supply 12 and one redundant power supply. Also, although FIG. 1 illustrates power supplies 12 being internal to electronic device 10, the techniques described in this disclosure are not so limited. Power supplies 12 may be external to electronic device 10 in some examples.

Power supply 12A includes automatic transfer switch (ATS) 14A, power factor corrector (PFC) 16A, capacitor 18A, and monitor circuit 20A. Power supply 12A may include additional components that are not illustrated for brevity. As described in more detail below, monitor circuit 20A may couple to relays within ATS 14A via control lines 22A and monitor lines 24A. Monitor circuit 20A also outputs fault signals via fault line 26A, and monitor circuit 20A is optionally coupled to communication line 28A for additional communication. In examples where monitor circuit 20A is coupled to communication line 28A, it may be possible, but not necessary, for fault line 26A to be part of communication line 28A (e.g., no additional fault line 26A is needed). Power supplies 12B-12N include similar components and coupling (e.g., ATSs 14B-14N, PFCs 16B-16N, capacitors 18B-18N, and monitor circuits 20B-20N). Monitor circuits 20B-20N couple to relays of respective ATSs 14B-14N via respective control lines 22B-24N and monitor lines 24B-24N, couple to respective fault lines 26B-26N, and optionally to respective communication lines 28B-28N.

Each one of power supplies 12 receives power from a plurality of power feeds. In the example of FIG. 1, L1 and N1 form a first power feed, where L1 is the "hot" line and carries the voltage, and N1 is the return, neutral line. L2 and N2 form a second power feed, where L2 is the "hot" line, and N2 is the return, neutral line. For purposes of brevity, L1 and N1 together are referred to as a first power feed and L2 and N2 together are referred to as a second power feed.

The first and second power feeds provide alternating-current (AC) voltage to power supplies 12. As one example, the first and second power feeds provide approximately 250 volts AC (VAC) to 300 VAC. In some examples, the first power feed may be a primary power feed, and the second power feed may be a redundant, secondary power feed.

For example, power supplies 12 receive the AC voltage from the first power feed and convert the AC voltage to a direct-current (DC) voltage, and supply the DC voltage to the components of electronic device 10 coupled to respective power supplies 12. If the first power feed becomes unavailable (e.g., due to a power failure, a disconnection, etc.), power supplies 12 utilize the AC voltage from the second power feed and convert that AC voltage to the DC voltage to supply power to the components of electronic device 10 coupled to respective power supplies 12.

In this way, even if the first power feed becomes unavailable, power supplies 12 are still able to supply power to the components of electronic device 10. If the first power feed becomes available again, power supplies 12 may switch back from the second power feed back to the first power feed as the source for supplying power. In this example, the second power feed is a redundant power feed to the first power feed and available for back-up purposes to ensure power is available the components of electronic device 10 in case the primary power feed (e.g., the first power feed) becomes unavailable.

The respective ATSs 14 of power supplies 12 may switch between the first and second power feeds so that power supplies 12 output supply voltage from one of the first and second power feeds. As described in more detail, ATSs 14 include a plurality of currently available relays that require no modification arranged in a multi-stage structure, where each stage includes one or more of the relays. The relays of ATSs 14 may receive control signals from respective monitor circuits 20, in some examples, that cause the relays to switch from one power feed to another. For example, respective monitor circuits 20 may transmit control signals to respective ATSs 14 via respective control lines 22 that cause the relays to switch from one power feed to another. However, in some examples, another controller within power supplies 12 may transmit the control signals that cause the relays of respective ATSs 14 to switch from one power feed to another. In either of these examples, monitor circuits 20 may monitor the value of the control signals of respective control lines 22.

ATSs 14 output the AC voltage to respective power factor correctors (PFCs) 16. PFCs 16 convert the AC voltage to DC voltage. One example of PFCs 16 is a rectifier. In some examples, PFCs 16 may perform additional functions than rectifying. For instance, PFCs 16 may also be configured to ensure that respective power supplies 12 are sourcing the appropriate amount of current, or perform any other desired conditioning of the DC voltage.

PFCs 16 output the DC voltage to respective capacitors 18. Capacitors 18 may further stabilize the DC voltage outputted by PFCs 16 (e.g., remove any remaining ripples due to the conversion from AC voltage to DC voltage). In addition, capacitors 18 may provide temporary power to the components of electronic device 10 during the switching from one power feed to another. For example, during the switch over period for when ATSs 14 are in the process of switching from the first power feed to the second power feed (or back), power supplies 12 are temporarily not receiving power from any power feed.

During this switch over period, capacitors 18 may supply the power to respective components of electronic device 10. For example, during operation, the DC voltage that PFCs 16 output charges respective capacitors 18. During the switch over period from one power feed to another, capacitors 18 supply power to the components, and discharge. After the switch over is complete, and PFCs 16 are outputting DC voltage again, the DC voltage recharges respective capacitors 18. Since capacitors 18 supply power during the switch over period, capacitors 18 may be referred to as holdup capacitors (e.g., capacitors 18 holdup the voltage when ATSs 14 switch from one power feed to another).

The components of electronic device 10 may sink a relative high amount of current. Accordingly, capacitors 18 may be required to be relatively large to accommodate the sinking of the high amount of current for the duration of the switch over period. In other words, capacitors 18 may be required to store a relatively large amount of charge. In some examples, capacitors 18 may be the largest sized component of power supplies 12. For example, capacitors 18 may be approximately 2×560 uF micro-farads (uF) with dimensions of approximately 35 mm×40 mm for a 3 KW supply without ATS 14A. With ATS 14A an additional capacitor may be needed to provide additional hold up during switch over due to uncertainty of switch over time or aging of switching circuits. As described in more detail, the techniques may actively monitor to measure the switch over time and changes due to aging of relay switching time. In this manner, it may be possible to keep the number of capacitors 18 to 2×560 uf (35 mm×40 mm) or using a smaller 3×470 uf (25 mm×35 mm) 470 uF vs. 3×560 uf (35 mm×40 mm).

Utilizing smaller sized capacitors 18 may save space and reduce air flow blockage, thus allowing for higher density power supply.

One of the factors of the size of capacitors 18 is the rate at which ATSs 14 are able to switch from one power feed to another. The faster ATSs 14 are able to switch, the shorter the amount of time capacitors 18 need to deliver power, which allows for smaller sized capacitors 18. As described in more detail, by utilizing relays within ATSs 14 in the multi-stage structure, ATSs 14 may provide for extremely fast switch over from one power feed to another. As also described in more detail, monitor circuits 20 may, in some examples, determine the rate at which the relays within respective ATSs 14 are switching. If the switch over period is increasing (e.g., due to degradation in the relays), monitor circuits 20 may indicate as such. A user (e.g., technician) may then take measures to address the issue, possibly by disconnecting the one of power supplies 12 with the one of ATSs 14 with the degraded relay(s), and replacing, or by disconnecting and relying upon the redundant one of the power supplies 12 (e.g., the $N^{th}+1$ power supply).

In the illustrated example, power supplies 12 include respective ATSs 14. Some other techniques did not utilize an ATS. In these other techniques, electronic device 10 required N+N power supplies, where N power supplies delivered power and N power supplies provided backup power (e.g., N power supplies were coupled to the first power feed and the other N power supplies were coupled to the second power feed). Utilizing N+N power supplies results in the power supplies requiring approximately twice as much space as utilizing N power supplies 12 or N+1 power supplies 12. With ATSs 14, power supplies 12 are capable of switching from one power feed to another allowing for N power supplies 12 (or N+1 power supplies 12 if additional redundancy is desired).

Some other techniques utilized an ATS (not like ATSs 14), but not necessarily within power supplies 12. Such an ATS would reside at the system level (e.g., building power infrastructure level, and not at the equipment level), and switch between power feeds for all of power supplies 12, rather than having an ATS for each power supply. The switch over period for the ATS that resided at the system level, and not within the power supply, may be too long requiring larger sized holdup capacitors 18. However, it may be describable to keep the size of capacitors 18 as small as possible, because requiring one step larger capacitors 18 than needed may be a non-competitive increase in the size of power supplies 12.

By including ATSs 14 within respective power supplies 12, ATSs 14 may be designed with fast switch over times that allows for keeping the size of capacitors 18 as small as possible. However, including ATSs 14 within respective power supplies 12 requires safety considerations. Within ATSs 14, a possible shock hazard exists if one of the power feeds couples to another one of the power feeds. For instance, if L1 of the first power feed coupled directly to N1 of the first power feed, coupled to L2 of the second power feed, or coupled to N2 of the second power feed, there may be a shock.

Various agencies have defined standards for such shock protection. For example, the Underwriters' Laboratories and other safety agencies have defined standards which define a minimum spacing requirement between the power feeds within ATSs 14. One example of a standard that defines the minimum spacing requirement is the International Electrotechnical Commission (IEC) 60950-1 Edition 2.0 2005-12 standard, which is incorporated by reference herein in its entirety. The IEC 60950-1 standard defines the safety of information technology equipment. Within the IEC 60950-1 standard, the section 2.10, entitled "Clearances, creepage distances and distances through insulation," the section 2.8.7.1 related to Contact Gaps within section 2.8, entitled "Safety interlocks," and the section 3.4.2 related to Disconnect Devices within section 3.4, entitled "Disconnection from the mains supply" describe various requirements for the spacing between the power feeds within ATSs 14.

The consumer of electronic device 10, or at least of power supplies 12, may find it desirable to ensure that electronic device 10 and/or power supplies 12 meet the safety requirements promulgated by the safety agencies. In some examples, ATSs 14 may be designed such as to provide the required minimum spacing making the switching portion of power supplies 12 compliant with the safety requirements.

However, the techniques described in this disclosure do not require ATSs 14 to be compliant with standards from various agencies. For instance, as described in more detail, the techniques described in this disclosure provide for a mechanism by which to determine (e.g., detect) whether any of ATSs 14 are malfunctioning, where the malfunction cannot be easily observed (e.g., a malfunction where there is no immediate impact to power supplies 12). The techniques described in this disclosure may be utilized to ensure that the spacing requirement is met, whether the safety requirement is part of a standard or whether the spacing requirement is part of a manufacturer policy or consumer demand independent of any standard. In general, the techniques described in this disclosure may be utilized to monitor the functionality of one or more relays within ATSs 14, and detect a malfunction based on the monitoring. For purposes of illustration, the techniques are described with respect to monitoring ATSs 14 for purposes of ensuring that the spacing requirement is met (e.g., standards based spacing requirement or standards independent spacing requirement).

For example, monitor circuits 20 monitor output ports of the relays within respective ATSs 14. The first and second power feeds couple to input ports of the relays, and the relays include switches that toggle such that ATSs 14 output AC voltage from either the first power feed or the second power feed (i.e., select between the first power feed and the second power feed). The relays within ATSs 14 may be arranged in a multi-stage structure which ensures that the minimum spacing requirements are met, as illustrated and described more with respect to FIG. 2.

However, if one of the relays malfunctions (e.g., a switch does not toggle and becomes stuck), ATSs 14 may not meet the spacing requirements. In some instances, the malfunction in the relay may be not be observable because there may be no appreciable change in the functionality of power supplies 12, although a shock hazard may now be present. In accordance with the techniques described in this disclosure, by monitoring the relays within ATSs 14, monitor circuits 20 may determine whether the spacing requirement is no longer being met (e.g., detect that the spacing requirement is no longer being met or still being met).

Figure 2:
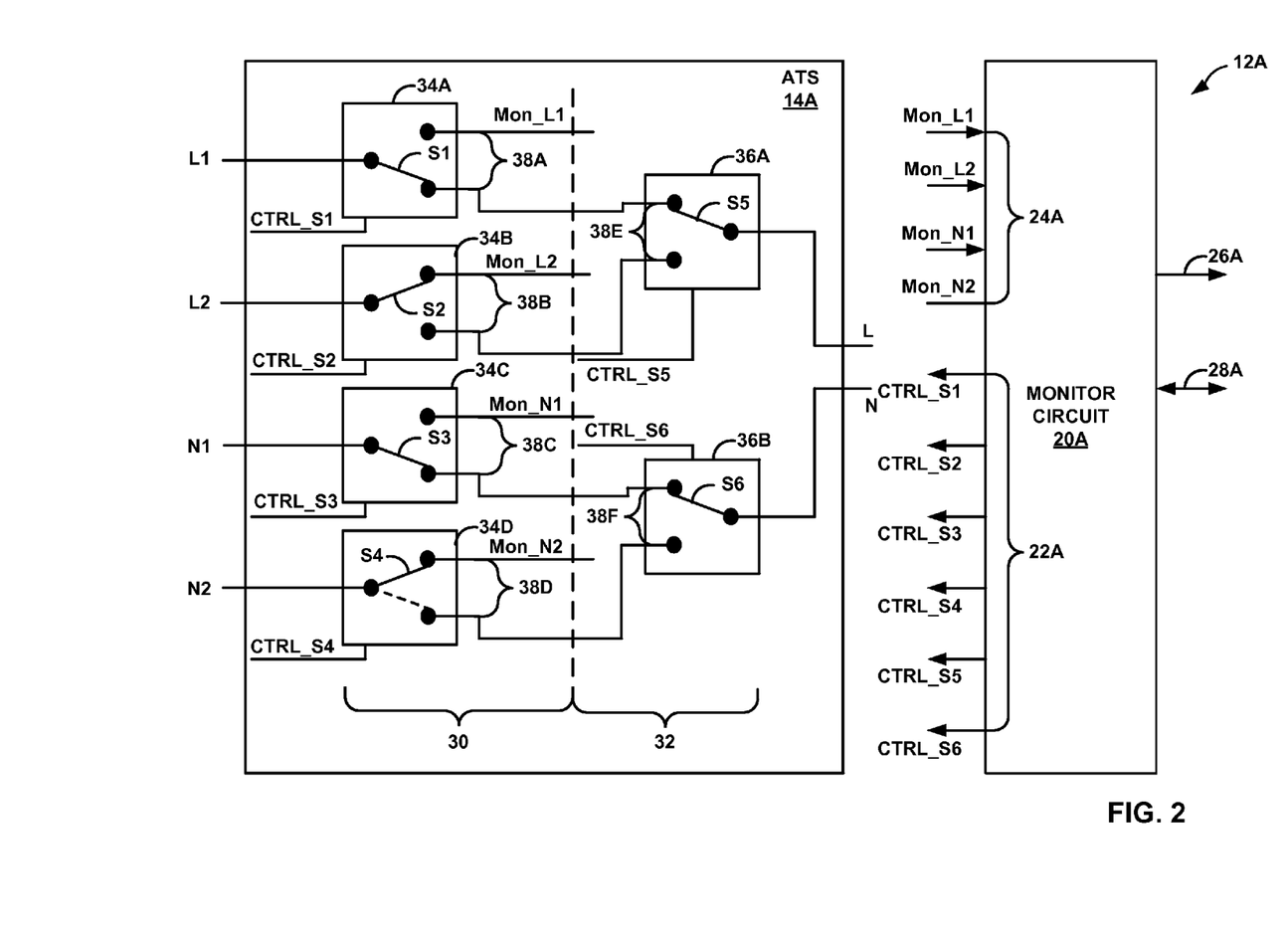
FIG. 2 is a block diagram illustrating one example of an automatic transfer switch (ATS) and a monitor circuit of a power supply.

FIG. 2 is a block diagram illustrating an example of an automatic transfer switch (ATS) and a monitor circuit of a power supply. For example, FIG. 2 illustrates ATS 14A and monitor circuit 20A of power supply 12A in further detail. ATSs 14B-14N and monitor circuits 20B-20N may be substantially similar to ATS 14A and monitor circuit 20A.

Examples of monitor circuit 20A include, but are not limited to, one or more digital signal processors (DSPs), general purpose microprocessors, application specific integrated circuits (ASICs), field programmable logic arrays (FPGAs), or other equivalent integrated or discrete logic circuitry. In some examples, monitor circuit 20A may be formed within a single integrated circuit (IC) chip. In some examples, a plurality of IC chips may together form monitor circuit 20A (e.g., a chip set forms monitor circuit 20A).

In some examples, monitor circuit 20A may execute software or firmware that causes monitor circuit 20A to implement the techniques described in this disclosure. The software or firmware may be stored in a computer-readable storage media such as random access memory (RAM), read only memory (ROM), EEPROM, CD-ROM or other optical disk storage, magnetic disk storage, or other magnetic storage devices, flash memory, or any other medium that can be used to store desired program code in the form of instructions or data structures and that can be accessed by monitor circuit 20A.

For example, monitor circuit 20A may receive instructions via communication line 28A that is coupled to the computer-readable storage media. As one example, communication line 28A may be an I-two-C (I2C) bus (sometimes referred to as $I^2C$ bus). Accordingly, in some examples, the techniques described in this disclosure may be directed to a computer-readable storage medium having instructions stored thereon that when executed cause one or more processors (e.g., monitor circuit 20A) to implement the techniques described in this disclosure.

ATS 14A includes a plurality of relays configured in a multi-stage structure. For example, ATS 14A includes relays 34A-34D (collectively referred to as "relays 34") in a first, inner stage 30 and includes relays 36A and 36B (collectively referred to as "relays 36") in a second, outer stage 32. In this example, inner stage 30 and outer stage 32 together form the multi-stage relay structure of ATS 14A, where each stage includes one or more relays.

Examples of relays 34 are relays that include one input port and two output ports (i.e., a first output port and a second output port), and a switch that couples the input port to either the first output port or the second output port. For example, relays 34 include switches S1-S4, respectively, where respective switches S1-S4 couple input ports to one of the output ports of respective relays 34. Examples of relays 36 are relays that include two input ports (i.e., a first input port and a second input port) and one output port, and a switch that couples either the first input port or the second input port to the output port. For example, relays 36 include switches S5 and S6, where respective switches S5 and S6 couple one of the input ports to the output ports of respective relays 36.

The multi-stage configuration that includes relays 34 in first stage 30 and relays 36 in second stage 32 may ensure that there is sufficient spacing between power feeds within ATS 14A. In the techniques described in this disclosure, the spacing between power feeds refers to a physical distance between connection points where it is possible for the power feeds to inadvertently connect to one another within ATS 14A. There may be some insulating material between such connection points.

As an example of assist with understanding of the spacing, assume that L1 of the first power feed is coupled to a first input port of a hypothetical relay, and that L2 of the second power feed is coupled to a second input port of the relay. In this example, there may be a physical distance between the first input port and the second input port of this hypothetical relay. For instance, there may be an air gap between the first input port and the second input port within the hypothetical relay, where the air gap, in this example, forms the insulation between the first input port and the second input port of the hypothetical relay.

If the physical distance between the first and second input ports of the hypothetical relay is greater than or equal to the spacing requirement, then utilizing this hypothetical relay within ATS 14A would be compliant with the spacing requirements because the physical distance separating L1 of the first power feed and L2 of the second power feed is greater than or equal to the spacing requirement. As one example, the spacing requirement may four millimeters (mm). In this example, if the physical distance between the input ports of the hypothetical relay is greater than or equal to four mm, then ATS 14A can include the hypothetical relay and be compliant with the safety requirements.

However, such a hypothetical relay may not be readily available. As one example, relays whose input ports have four mm spacing may not be available, and waiting for such relays to be developed may be cost and time prohibitive with consumers of electronic device 10 wanting power supplies 12 to meet the safety requirements now, and not after development.

Moreover, even if such a hypothetical relay did exist, there may be other requirements that make the relay undesirable within a given electronic device. For example, a switch for a relay with longer spacing between input ports (e.g., four mm) typically takes longer to switch from one input port to another as compared to a switch for a relay with shorter spacing between input ports (e.g., two mm). This is because the switch for the relay with the longer spacing needs to traverse a longer distance, taking more time, than the switch for the relay with shorter spacing (e.g., takes longer to traverse four mm as compared to two mm). As described above, the size of capacitor 18A is directly proportional to switch over period of the relay (i.e., longer switch over period, bigger capacitor 18A), and it is desirable to keep the size of capacitor 18A relatively small. The switch over period of a relay with four mm spacing between input ports may be too long causing the size of capacitor 18A to be undesirably large. Accordingly, even if a four mm spacing relay were available, it may still be beneficial to utilize two two mm spacing relays that combine to provide four mm of spacing, but with a much shorter switch over period.

In FIG. 2, relays 34 and relays 36 may be relays that are currently available so that it is possible to implement ATS 14A without needing to wait for newly designed relays. For example, relays 34 and relays 36 may be mechanical relays that are safety agency recognized components.

However, the spacing between ports of relays 34 and relays 36 may be less than a desired spacing threshold (e.g., spacing requirement). For example, FIG. 2 illustrates spacing 38A-38D for respective relays 34A-34D and spacing 38E and 38F for relays 36A and 36B, respectively. In this example, each one of spacing 38A-38F may not provide sufficient spacing to meet a spacing threshold (e.g., the spacing needed for the safety requirements), but the arrangement of relays 34 and 36 in the multi-stage relay structure may provide for additive spacing such that the total spacing is sufficient to meet the safety threshold.

For instance, for purposes of illustration only, assume that the spacing threshold (e.g., the minimum spacing needed to meet the safety requirement) is four mm. Also, in the example, assume that spacing 38A-38F is two mm (e.g., less than spacing threshold). The spacing between one line of the first power feed (e.g., L1 of the first power feed) and one line of the second power feed (e.g., L2 of the second power feed) is determined as follows. A current starting from L1 would pass through switch S1 of relay 34A and into the top (first) input port of relay 36A. For the current to reach L2 of the second power feed, a shock would need to generate that transfers charge from the upper (first) input port of relay 36A to the bottom (second) input port of relay 36A. In other words, the charge would need to traverse spacing 38E, which is two mm. Again, spacing 38E may be highly insulated (e.g., an air gap), so no current can easily flow from the top input port of relay 36A to the bottom input port of relay 36A.

At this juncture, spacing 38E provides two mm of spacing between L1 of the first power feed and L2 of the second power feed. If the charge were to jump across spacing 38E (i.e., due to a shock), the current would then reach relay 34B via the bottom (second) output port of relay 34B. To reach L2 of the second power feed, another shock would be required to carry the charge across spacing 38B because spacing 38B may be highly insulated (e.g., air gap) so no current can easily flow from the bottom output port of relay 34B to the top output port of relay 34B. Spacing 38B may also be two mm.

Accordingly, in this example, the spacing between one line of a first power feed (e.g., a power line or a hot line of the first power feed) and another line of a second power feed (e.g., a power line or a hot line of the second power feed), within ATS 14A, may be the sum of the spacing between ports of a relay in at least the first stage of the multi-stage structure of relays and a relay in at least a second stage of the multi-stage structure of relays, where the spacing between ports of the relay in the first stage and the relay in the second stage is less than the spacing threshold, and where the sum of the spacing between the ports is greater than or equal to the spacing threshold. For example, the sum of the spacing between the ports of relay 34B in first stage 30 and the ports of relay 36A in second stage 32 is greater than or equal to the spacing threshold (e.g., four mm), where the spacing between ports of relay 34B and relay 36A is less than the spacing threshold (e.g., two mm is less than four mm).

In this way, the spacing starting from L1 to L2 is greater than or equal to the spacing threshold. The spacing starting from L2 back to L1 can similarly be determined, and is similarly greater than or equal to the spacing threshold. The spacing between N1 and N2 (i.e., the neutral lines of the first and second power feeds) is similarly greater than or equal to the spacing threshold (assuming that switch S4 is coupled to the top (first) output port of relay 34D).

In the example illustrated in FIG. 2, switches S1-S6 may be controlled by respective control signals CTRL_S1-CTRL_S6. In this example, monitor circuit 20A outputs CTRL_S1-CTRL_S6 via control lines 22A (i.e., control lines 22A include six lines in this example). During normal operation when power supply 12A supplies power from the primary power feed (e.g., the first power feed), monitor circuit 20A outputs CTRL_S1 to cause switch S1 to couple to the bottom port of relay 34A, outputs CTRL_S5 to cause switch S5 to couple to the top port of relay 36A, outputs CTRL_S3 to cause switch S3 to couple to the bottom port of relay 34C, and outputs CTRL_S6 to cause switch S6 to couple to the top port of relay 36B. In this way, there is direct current path from one output of ATS 14A (e.g., L or power line output of ATS 14A) back to the power line (e.g., L1) of the primary power feed, and a direct current path from another output of ATS 14A (e.g., N or neutral line output of ATS 14A) back to the neutral line (e.g., N1) of the primary power feed.

From a functional perspective, the positions of switches S2 and S4 may not be material because the positions of switches S5 and S6 in respective relays 36A and 36B ensure that output L of ATS 14A is not coupled to L2 of the second power feed, and output N of ATS 14A is not coupled to N2 of the second power feed. Accordingly, regardless of the positions of switches S2 and S4, ATS 14A may be supplying power from the primary power feed.

However, from a safety perspective, the positions of switches S2 and S4 may be important. For example, if switch S2 were coupled to the bottom output port of relay 34B (rather than the top output port of relay 34B, as illustrated), then the only spacing between L1 and L2, within ATS 14A, is provided by spacing 38E (spacing 38B will not be available because switch S2 is coupled to the bottom output port of relay 34B). In this example, spacing 38E may not provide sufficient spacing (e.g., spacing 38E may be less than the spacing threshold).

Accordingly, even when power supply 12A is supplying power from the first, primary power feed, monitor circuit 20A may output CTRL_S2 to cause switch S2 to couple to the top port of relay 34B, and output CTRL_S4 to cause switch S4 to couple to the bottom port of relay 34D. Then, if the primary power feed became unavailable, monitor circuit 20A may cause each one of switches S1-S6 to toggle from their current position via CTRL_S1-CTRL_S6. In this configuration, the output of ATS 14A (i.e., L and N) are directly coupled to the backup, second power feed (i.e., L2 and N2, respectively).

In this manner, the multi-stage structure of relays of ATS 14A provides for minimum safety spacing, with a lowest number of relays, and a fast switch over period that allows for smaller sized holdup capacitor 18A. However, if one of relays 34 or relays 36 malfunctions, the spacing requirement may not be met. In accordance with the techniques described in this disclosure, monitor circuit 20A may detect whether any of relays 34 or relays 36 malfunctions such that the spacing requirement is not being met.

Monitor circuit 20A may monitor ports of relays in at least one of the stages of the multi-stage structure of relays within ATS 14A. For instance, monitor circuit 20A may monitor ports of relays 34 within the first, inner stage 30. As one example, monitor circuit 20A may monitor ports of relays 34 within the first, inner stage 30 that are not coupled to relays 36 in the second, outer stage 32. For instance, the top output ports of relays 34 are not coupled to any of relays 36, and monitor circuit 20A may monitor the top output ports of relays 34, in this example. In this example, monitor circuit 20A may monitor the top output ports of relays 34 via monitor lines 24A.

Based on the monitoring via monitor lines 24A, and in some examples, based on the control signals via control lines 22A, monitor circuit 20A may determine whether any of switches S1-S4 are not properly coupled such that the spacing requirement is not being met. For example, in the correct configuration where switch S1 is coupled to the bottom output port of relay 34A, and switch S2 is coupled to the top output port of relay 34B, by monitoring at least the top output port of relay 34B, monitor circuit 20A may determine whether switch S2 is in the correct position.

For instance, with switch S2 coupled to the top output port of relay 34B, the voltage on Mon_L2 should be equal to the voltage of the second power feed (L2). If the voltage on Mon_L2 is not equal to the voltage of L2 of the second power feed, monitor circuit 20A may determine that switch S2 is not in the proper position (e.g., possibly coupled to the bottom output port of relay 38B). As described above, if switch S2 is coupled to the bottom output port of relay 38B, and power supply 12A is supplying power from the first power feed, then the spacing requirement may not be met.

In this example, if monitor circuit 20A determines that the voltage on Mon_L2 is not equal to the voltage of L2, monitor circuit 20A may output a fault signal via fault line 26A. For example, fault line 26A may be coupled to an error light emitting diode (LED) that lights up based on the fault signal to indicate that there may be a possibility that ATS 14A is not meeting the spacing requirements. As another example, fault line 26A may be coupled to circuitry within electronic device 10 that outputs the error to a network administrator via the network with which electronic device 10 is coupled.

In the above example, monitor circuit 20A monitored the voltage via monitor lines 24A. In some examples, rather than monitoring the voltage, monitor circuit 20A may monitor the impedance. For instance, during normal operation (e.g., power supply 12A is supplying power from the primary power feed), the impedance between the top output port of relay 34B and L2 of the second power feed should be approximately zero ohms. If the impedance is not approximately zero ohms during normal operation, monitor circuit 20A may determine that switch S2 is not properly coupled and the spacing requirement may not be being met. Monitoring the voltage and the impedance are two examples. In general, monitor circuit 20A may utilize any technique to monitor one of the ports of the relays in the first stage of the multi-stage structure to detect that the spacing requirement is being met or not being met.

In some examples, monitor circuit 20A may receive a value, indicative of the output of the output ports via monitor lines 24A, and compare the received value to an expected value. For instance, it may be possible that the value of the output ports (e.g., the top output port of relay 34B) is modified to a level that monitor circuit 20A can receive (e.g., 250 VA is reduced to a digital level). In this example, monitor circuit 20A may store an expected value that indicates the digital level of the modified value. Monitor circuit 20A may compare the received value to the expected value to detect that the spacing requirement is being met or not being met. In examples where the value of the output ports of relays 34 that are monitored is not reduced, then the expected value may equal the monitored value. In general, any technique that allows monitor circuit 20A to determine whether the switches within relays 34 are connected to the correct output port of relays 34 may be utilized, and monitoring the voltage or impedance at one of the output ports of relays 34 is provided for purposes of illustration only.

In some examples, in addition to the monitoring one output port of each of relays 34 to detect that the spacing requirement is being met or not being met, monitor circuit 20A may also monitor the control signals on control lines 22A to determine whether there is a malfunction in relays 34 or in the control signals. For example, keeping with the above example, assume that based on the monitoring of Mon_L2, monitor circuit 20A determined that switch S2 is coupled to the bottom output port of relay 34B (rather than the top output port of relay 34B, as illustrated). In this example, monitor circuit 20A may also determine the value of CTRL_S2. If the value of CTRL_S2 is such that CTRL_S2 caused switch S2 to be coupled to the bottom output port of relay 34B, monitor circuit 20A may modify the value of CTRL_S2 so that CTRL_S2 causes switch S2 to be coupled to the top output port of relay 34B. In this manner, monitor circuit 20A may implement proactive measures to ensure that the spacing requirement is being met. If, however, the value of CTRL_S2 is such that switch S2 should be coupled to the top output port of relay 34B, but switch S2 is coupled to the bottom output port of relay 34B, monitor circuit 20A may output a fault signal via fault line 26A.

In these examples, monitor circuit 20A may receive a value indicative of the value at the monitored output ports of relays 34 and may compare the received value to the expected value based on the value of the control signals on control lines 22. For example, if the control signals on control lines 22 indicate that switch S2 is coupled to the top output port of relay 34B, monitor circuit 20A may expect a value indicative of the voltage on L2. If the control signals on control lines 22 indicate that switch S2 is coupled to the bottom output port of relay 34B, monitor circuit 20 may expect a value indicative of when the top output port is not connected to power line L2.

The following is another example to illustrate the manner in which monitor circuit 20A and ATS 14A may be function together to detect whether the spacing requirements between the first and second power feeds within ATS 14A are being met. In this example, assume that the primary power feed became unavailable. Therefore, switch S1 is coupled to the top output port of relay 34A, switch S2 is coupled to the bottom output port of relay 34B, switch S3 is coupled to the top output port of relay 34C, switch S4 is coupled to the bottom output port of relay 34D, switch S5 is coupled to the bottom input port of the relay 36A, and switch S6 is coupled to the bottom input port of relay 36B. In this configuration, power supply 12A is supplying power from the backup, second power feed that includes L2 as the power or hot line, and N2 as the neutral line.

Then, the primary power feed becomes available, and switches S1 and S3 couple to the bottom output ports of relays 34A and 34C, respectively, and switches S5 and S6 couple to the top input ports of relays 36A and 36B, respectively. Switch S2 couples to the top output port of relay 34B. Switch S4 should couple to the top output port of relay 34D, but remains stuck to the bottom output port of relay 34D, as illustrated by the dashed line.

In this example, monitor circuit 20A may be configured to continuously monitor ports of relays 34 via monitor lines 24, or may be configured to monitor ports of relays 34 via monitor lines 24 in response to a switching from one power feed to another. In this example, monitor circuit 20A may determine that the Mon_N2 should indicate that the impedance from the top output port of relay 34D to the input port of relay 34D (e.g., to N2 of the second power feed) is approximately zero ohms. However, because switch S4 is stuck and coupled to the bottom output port of relay 34D, based on the monitoring of Mon_N2, monitor circuit 20A may determine that the impedance from the top output port of relay 34D to N2 of the second power feed is greater than approximately zero ohms.

In response, monitor circuit 20A may determine that relay 34D is malfunctioning and the spacing requirements may not be met. Monitor circuit 20A may output a fault signal via fault line 26A. In some examples, to determine whether the malfunction lies with relay 34D or with the control signal CTRL_S4, monitor circuit 20A may determine the value of CTRL_S4. If the value of CTRL_S4 indicates that switch S4 should be coupled to the bottom port of relay 34D, then monitor circuit 20A may determine that the malfunction lies with the control signal, and not relay 34D. For example, monitor circuit 20A may compare the value of CTRL_S4 and the impedance value (or possibly the voltage value) of Mon_N2 and based on the comparison determine whether the malfunction lies with relay 34D or CTRL_S4.

In accordance with the techniques described in this disclosure, the multi-stage structure of relays allows ATS 14A to meet the minimum spacing requirements, while providing fast switching from one power feed to another. Monitor circuit 20A allows for the detection that the spacing requirements are not being met or are being met, even if there are no other functional problems. For instance, keeping with the previous example, assume that switch S4 remained stuck and coupled to the bottom output port of relay 34D after switching back to the primary power feed. In this example, the spacing between N1 and N2 would only be two mm from spacing 38F since the additional two mm provided by spacing 38D is unavailable.

However, even though the spacing requirement is not met, there may be no functional problems with power supply 12A. For example, because of relays 36A and 36B, the output of ATS 14A is the AC voltage of the first power feed even if switch S4 is coupled to the bottom output port of relay 34D. Without monitor circuit 20A, it may be overly complicated and costly to detect a violation of the spacing requirement occurred because there may be not functional issues. For instance, a technician may need to periodically open power supply 12A, test the location of the switches, and then confirm whether the spacing requirement is being met. Requiring a technician to perform such testing may be cost prohibitive.

Monitor circuit 20A may be configured to detect that the spacing requirement is met or not met during various times. For example, at manufacture time, the manufacture may have access to the internals of ATS 14A, but after power supply 12A is encased, and prior to shipping, access to the internals of ATS 14A may not be available. By utilizing monitor circuit 20A, the manufacturer may be able to conform that the spacing requirement within ATS 14A is met before shipping electronic device 10 to the consumer. Once electronic device 10 is in use, there may be possibility for relays 34 of ATS 14A to malfunction in such a way that the spacing requirement is not met, even if there are no functional problems. Monitor circuit 20A may provide in-the-field (e.g., during operation) confirmation of whether the spacing requirement, within ATS 14A of power supply 12A, is being met.

In the above examples, monitor circuit 20A monitors the ports of relays 34 of inner stage 30 to detect whether the spacing requirement is being met, and not the ports of relays 36 of outer stage 32. In some examples, it may be possible for monitor circuit 20A to monitor the ports of relays 36; however, such monitoring may not be necessary. For example, regardless of the position of switches S5 and S6, spacing 38E and spacing 38F may always provide at least the two mm spacing between L1 and L2 and N1 and N2, respectively. In other words, in some examples, it may not be possible to bypass spacing 38E and spacing 38F like bypassing spacing 38A-38D, which are based on the position of switches S1-S4, respectively.

In addition to monitoring the ports of inner stage relays 34 to detect whether the spacing requirement is not being met, in some examples, monitor circuit 20A may determine various other characteristics of ATS 14A. As one example, over time, relays 34 may degrade such that the switch over period becomes longer. If the switch over period becomes too long, capacitor 18A may not be sufficiently sized to holdup the voltage during the switch over period. Accordingly, in some examples, monitor circuit 20A may be configured to determine the switch over period.

To determine the switch over period, monitor circuit 20A may determine the time difference from when the value of a control signal changed to when the corresponding voltage or impedance on the monitor changed. For example, monitor circuit 20A monitors the value of CTRL_S1 and Mon_L1 of relay 34A. During normal operation where power supply 12A supplies power from the first power feed, monitor circuit 20A may determine that the value of CTRL_S1 is a digital low (as one example), and that the value of Mon_L1 is approximately zero volts. Then, when power supply 12A is to deliver power from the second power feed, monitor circuit 20A (or some other controller) may change the value of CTRL_S1 from a digital low to a digital high, at a first time instance. At a second time instance, the value of Mon_L1 will rise from zero volts to a voltage based on the AC L1 voltage. Monitor circuit 20A may determine the time difference between the second time instance and the first time instance. The resulting value is the switch over period of relay 34A.

Monitor circuit 20A may determine whether the switch over period is greater than a switch over period threshold. The switch over period threshold may be pre-stored value that is computed by a manufacturer of electronic device 10 based on the desired size of capacitor 18A. If the determined switch over period is greater than the switch over period threshold, monitor circuit 20A may output an indication via communication line 28A indicating that the switch over period is longer than desired for one of relays 34. Communication line 28A may output the indication to a user (e.g., via the network to which electronic device 10 is coupled, via an LED, or via some other indication).

For example, assume that for the given size of capacitor 18A, capacitor 18A is capable of providing power for ten seconds. In this example, the manufacturer may set the switch over period threshold to be equal to ten seconds, or slightly less than ten seconds (e.g., eight seconds) so that if there is degradation, proactive measures can be taken. In this example, if monitor circuit 20A determines that the switch over period for any one of relays 34 is longer than eight seconds, monitor circuit 20A may output an indication via communication line 28A.

Figure 3:
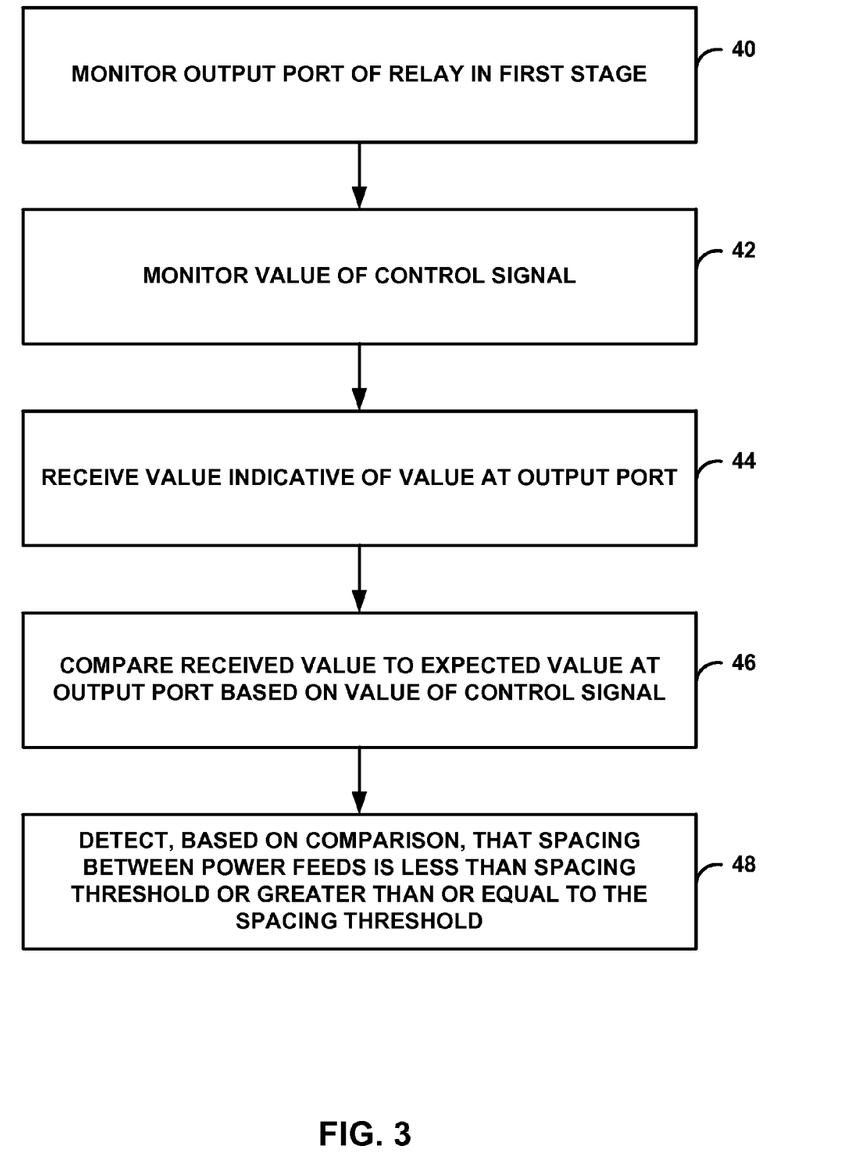
FIG. 3 is a flowchart illustrating techniques in accordance with one or more examples described in this disclosure.

FIG. 3 is a flowchart illustrating techniques in accordance with one or more examples described in this disclosure. For purposes of illustration, the example of FIG. 3 is described with respect to FIG. 2.

Monitor circuit 20A may monitor an output port of a relay in a first stage of the multi-stage structure of relays of ATS 14A (40). For example, monitor circuit 20A may monitor the top output port of relay 34B in first, inner stage 30 of ATS 14A. As described above, ATS 14A couples to a first AC power feed and a second AC power feed. In ATS 14A, a spacing between output ports of relays 34 of first, inner stage 30 and a spacing between input ports of relays 36 of second, outer stage 32 is less than a spacing threshold (e.g., less than the minimum spacing requirement).

However, a sum of the spacing between output ports of relays 34 of first, inner stage 30 and the spacing between input ports of relays 36 of second, outer stage 32 is greater than or equal to the spacing threshold (e.g., the sum of spacing 38B and spacing 38E is greater than or equal to the minimum spacing requirement). As described above, relays 34 and relays 36 may be mechanical relays that are safety agency recognized components.

In some examples, monitor circuit 20A may detect, based on the monitoring, that a spacing between the first power feed and the second power feed, within ATS 14A, is less than the spacing threshold or greater than or equal to the spacing threshold. For instance, monitor circuit 20A may monitor the output port of the output ports of relays 34 of the first, inner stage 30 that are not coupled to any of the relays of the second, outer stage 32. The monitoring may include at least one of monitoring a voltage and monitoring an impedance at the output ports of relays 34 that do not couple to any of relays 36.

To provide further assurance regarding whether the spacing between the power feeds meets the spacing requirement, monitor circuit 20A may monitor a value of a control signal (e.g., CTRL_S2) to the at least one relay (e.g., relay of 34B) of first, inner stage 30 (42). Monitor circuit 20A may receive a value indicative of a value at the output port (e.g., Mon_L2 at the output port) (44). Monitor circuit 20A may compare the received value to an expected value at the output port based on the value of the control signal (e.g., CTRL_S2) (46).

In this example, monitor circuit 20A may detect, based on the comparison, that the spacing between the first power feed and the second power feed, within the ATS, is less than the spacing threshold or greater than or equal to the spacing threshold (48). For example, monitor circuit 20A, based on the monitoring of the output port or based on the comparison between the received value at the output port and the expected value based on the control signal (for extra assurance), may determine whether a switch in at least one relay of the first stage is in an incorrect position such that the spacing between the first power feed and the second power feed, within the ATS, is less than the spacing threshold.

For instance, if switch S4 were stuck to the bottom output port of relay 34D, rather than in the correct position of the top output port of relay 34D, based on the monitoring of Mon_N2, monitor circuit 20A may determine that switch S4 is in the incorrect position such that the spacing between N1 (i.e., the neutral line) of the first power feed and N2 (i.e., the neutral line) of the second power feed, within ATS 14A, is less than the spacing threshold. As another example, monitor circuit 20A may similarly detect whether the spacing between L1 (i.e., the power line) of the first power feed and L2 (i.e., the power line) of the second power feed, within ATS 14A, is less than the spacing threshold.

With the monitoring by monitor circuit 20A and the multi-stage structure of ATS 14A, the techniques allow for determining compliance with the spacing requirements, even after access to ATS 14A is not readily available and there are not operational errors. With the multi-stage structure, ATS 14A may be compliant with spacing requirements defined by various safety agencies in various standards, may achieve Underwriters' Laboratories (UL), Canadian Standards Association (CSA), and/or Verband der Elektrotechnik (VDE) safety certification.

Figure 4:
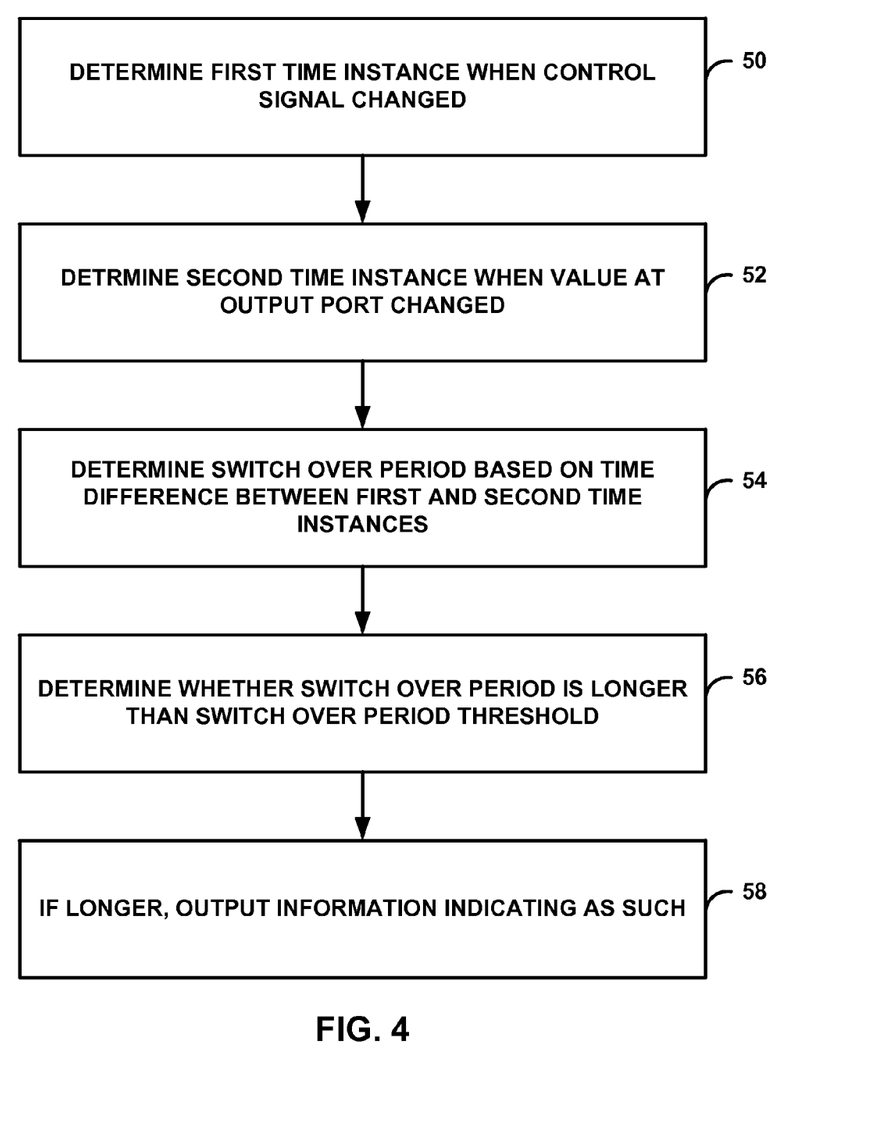
FIG. 4 is a flowchart illustrating techniques in accordance with one or more examples described in this disclosure.

FIG. 4 is a flowchart illustrating techniques in accordance with one or more examples described in this disclosure. For purposes of illustration, the example of FIG. 4 is described with respect to FIG. 2.

Monitor circuit 20A may determine a first time instance when a control signal for one of relays 34 changed values (50). Monitor circuit 20A may determine a second time instance, after the first time instance, when values at the output port of the one of relays 34 that is not coupled to relays 36 changed (52). Monitor circuit 20A may determine the switch over period of the one of relays 34 based on the time difference between the first time instance and the second time instance (54). Monitor circuit 20A may determine whether the switch over period is longer than the switch over period threshold (56). If the switch over period is longer, monitor circuit 20A may output an indication indicating that the switch over period for the one of relays 34 is longer than the switch over period threshold (58).

The techniques of this disclosure may be implemented in a wide variety of devices or apparatuses, with an integrated circuit (IC) or a set of ICs (i.e., a chip set). Various components, modules, or units are described in this disclosure to emphasize functional aspects of devices configured to perform the disclosed techniques, but do not necessarily require realization by different hardware units. Rather, various units may be combined in a hardware unit or provided by a collection of interoperative hardware units.

Various examples have been described. These and other examples are within the scope of the following claims.

The invention claimed is:

1. An electronic device comprising:
a power supply that couples to a first alternating current (AC) power feed and a second AC power feed;
an automatic transfer switch (ATS) comprising a multi-stage structure of relays, wherein a spacing between output ports of relays of a first stage of the multi-stage structure and a spacing between input ports of relays of a second stage of the multi-stage structure is less than a spacing threshold for preventing shock from coupling of the first AC power feed and the second AC power feed, wherein a sum of the spacing between output ports of one of the relays of the first stage and the spacing between input ports of one of the relays of the second stage is greater than or equal to the spacing threshold, and wherein the ATS is configured to output AC voltage from one of the first AC power feed and the second AC power feed, wherein the relays of the first stage are coupled to respective ones of the first and second AC power feeds, wherein the relays of the first stage comprise a first relay having one input port and two output ports, wherein the relays of the second stage comprise a second relay having two input ports and one output port, and wherein a first output port of the output ports of the first relay is connected to at least one of the input ports of the second relay, and a second output port of the output ports of the first relay is not coupled to any of the relays of the second stage; and
a monitor circuit configured to monitor at least one of the output ports of the relays of the first stage, and detect, based on the monitoring, that a spacing between the first power feed and the second power feed, within the ATS, is less than the spacing threshold, wherein the monitor circuit is configured to monitor at least one output port, of respective ones of one or more relays of the first stage, that is not coupled to any of the relays of the second stage.

2. The electronic device of claim 1, wherein the spacing between output ports of relays of the first stage comprises an air gap between the output ports, and wherein the spacing between input ports of relays of the second stage comprises an air gap between the input ports.

3. The electronic device of claim 1, wherein to detect that the spacing between the first power feed and the second power feed, within the ATS, is less than the spacing threshold, the monitor circuit is configured to detect, based on the monitoring, whether a switch in at least one relay of the first stage is in an incorrect position such that the spacing between the first power feed and the second power feed, within the ATS, is less than the spacing threshold.

4. The electronic device of claim 1, wherein to detect that the spacing between the first power feed and the second power feed, within the ATS, is less than the spacing threshold, the monitor circuit is configured to detect, based on the monitoring, whether the spacing between a power line of the first power feed and a power line of the second power feed is less than the spacing threshold.

5. The electronic device of claim 1, wherein to detect that the spacing between the first power feed and the second power feed, within the ATS, is less than the spacing threshold, the monitor circuit is configured to detect, based on the monitoring, whether the spacing between a neutral line of the first power feed and a neutral line of the second power feed is less than the spacing threshold.

6. The electronic device of claim 1, wherein the monitor circuit is configured to output a fault signal if the spacing between the first power feed and the second power feed, within the ATS, is less than the spacing threshold.

7. The electronic device of claim 1, wherein the monitor circuit is configured to:
monitor a value of a control signal to at least one relay of the first stage;
receive a value indicative of a value at an output port of the at least one relay of the first stage; and
compare the received value to an expected value based on the monitored value of the control signal,
wherein to detect that the spacing between the first power feed and the second power feed, within the ATS, is less than the spacing threshold, the monitor circuit is configured to detect that the spacing between the first power feed and the second power feed, within the ATS, is less than the spacing threshold based on the comparison.

8. The electronic device of claim 1, wherein the monitor circuit is configured to:
determine a first time instance when a value of a control signal to at least one relay of the first stage changed;
determine a second time instance when a value at the output port of the at least one relay of the first stage changed;
determine a switch-over period of the at least one relay of the first stage based on a time difference between the first time instance and the second time instance;
determine whether the switch-over period is longer than a switch over period threshold; and
when the switch over period is longer than the switchover period threshold, output information indicating that the switch over period is longer than the switch over period threshold based on the determination.

9. The electronic device of claim 1, wherein the power supply comprises a first power supply, the ATS comprises a first ATS, the multi-stage structure of relays comprises a first multi-stage structure of relays, and wherein the monitor circuit comprises a first monitor circuit, the electronic device further comprising:
a second power supply comprising:
a second ATS that includes a second multi-stage structure of relays; and
a second monitor circuit.

10. The electronic device of claim 1, wherein the monitor circuit is configured to monitor at least one of a voltage and an impedance at the at least one of the output ports of the relays of the first stage.

11. The electronic device of claim 1, wherein the power supply includes the ATS and the monitor circuit.

12. A power supply comprising:
an automatic transfer switch (ATS) that couples to a first alternating current (AC) power feed and a second AC power feed and comprises a multi-stage structure of relays, wherein a spacing between output ports of relays of a first stage of the multi-stage structure and a spacing between input ports of relays of a second stage of the multi-stage structure is less than a spacing threshold for preventing shock from coupling of the first AC power feed and the second AC power feed, wherein a sum of the spacing between output ports of one of the relays of the first stage and the spacing between input ports of one of the relays of the second stage is greater than or equal to the spacing threshold, and wherein the ATS is configured to output AC voltage from one of the first AC power feed and the second AC power feed, wherein the relays of the first stage are coupled to respective ones of the first and second AC power feeds, wherein the relays of the first stage comprise a first relay having one input port and two output ports, wherein the relays of the second stage comprise a second relay having two input ports and one output port, and wherein a first output ports of the output ports of the first relay is connected to at least one of the input ports of the second relay, and a second output port of the output ports of the first relay is not coupled to any of the relays of the second stage; and a monitor circuit configured to monitor at least one of the output ports of the relays of the first stage, and detect, based on the monitoring, that a spacing between the first power feed and the second power feed, within the ATS, is less than the spacing threshold, wherein the monitor circuit is configured to monitor at least one output port, of respective ones of one or more relays of the first stage, that is not coupled to any of the relays of the second stage.

13. The power supply of claim 12, wherein the spacing between output ports of relays of the first stage comprises an air gap between the output ports, and wherein the spacing between input ports of relays of the second stage comprises an air gap between the input ports.

14. The power supply of claim 12, wherein to detect that the spacing between the first power feed and the second power feed, within the ATS, is less than the spacing threshold, the monitor circuit is configured to detect, based on the monitoring, whether a switch in at least one relay of the first stage is in an incorrect position such that the spacing between the first power feed and the second power feed, within the ATS, is less than the spacing threshold.

15. The power supply of claim 12, wherein to detect that the spacing between the first power feed and the second power feed, within the ATS, is less than the spacing threshold, the monitor circuit is configured to detect, based on the monitoring, whether the spacing between a power line of the first power feed and a power line of the second power feed is less than the spacing threshold.

16. The power supply of claim 12, wherein to detect that the spacing between the first power feed and the second power feed, within the ATS, is less than the spacing threshold, the monitor circuit is configured to detect, based on the monitoring, whether the spacing between a neutral line of the first power feed and a neutral line of the second power feed is less than the spacing threshold.

17. The power supply of claim 12, wherein the monitor circuit is configured to:

monitor a value of a control signal to at least one relay of the first stage;

receive a value indicative of a value at an output port of the at least one relay of the first stage; and compare the received value to an expected value based on the monitored value of the control signal, wherein to detect that the spacing between the first power feed and the second power feed, within the ATS, is less than the spacing threshold, the monitor circuit is configured to detect that the spacing between the first power feed and the second power feed, within the ATS, is less than the spacing threshold based on the comparison.

18. A method comprising:

monitoring, with a monitor circuit, at least one of a plurality of output ports of relays of a first stage of a multi-stage structure of relays within an automatic transfer switch (ATS), wherein the ATS receives a first alternating current (AC) power feed and a second AC power feed, wherein the relays of the first stage are coupled to respective ones of the first and second AC power feeds, wherein a spacing between output ports of relays of the first stage of the multi-stage structure and a spacing between input ports of relays of a second stage of the multi-stage structure is less than a spacing threshold for preventing shock from coupling of the first AC power feed and the second AC power feed, wherein a sum of the spacing between output ports of one of the relays of the first stage and the spacing between input ports of one of the relays of the second stage is greater than or equal to the spacing threshold, wherein the at least one of the plurality of output ports of the relays of the first stage that is monitored is not coupled to any of the relays of the second stage, and wherein the ATS is configured to output AC voltage from one of the first AC power feed and the second AC power feed, wherein the relays of the first stage a first relay having one input port and two output ports, wherein the relays of the second stage comprise a second relay having two input ports and one output port, and wherein a first output port of the output ports of the first relay is connected to at least one of the input ports of the second relay, and a second output port of the output ports of the first relay is not coupled to any of the relays of the second stage; and detecting, based on the monitoring, that a spacing between the first power feed and the second power feed within the ATS is less than the spacing threshold.

* * * * *